United States Patent [19]

Lange et al.

[11] Patent Number: 4,858,857

[45] Date of Patent: Aug. 22, 1989

[54] DOCKING MECHANISM FOR SPACECRAFT

[75] Inventors: Gregory A. Lange; John P. McManamen; John A. Schliesing, all of Houston, Tex.

[73] Assignee: The United States of America as represented by the Administrator of the National Aeronautics and Space Administration, Washington, D.C.

[21] Appl. No.: 292,123

[22] Filed: Dec. 30, 1988

[51] Int. Cl.$^4$ .............................................. B64G 1/64
[52] U.S. Cl. .................................. 244/161; 244/159; 405/188; 166/343
[58] Field of Search .................. 244/158 R, 159, 160, 244/161, 162; 166/338, 340–343, 349; 405/188, 189, 192

[56] References Cited

U.S. PATENT DOCUMENTS

| Re. 27,903 | 1/1974 | Fogarty | 244/1 SD |
|---|---|---|---|
| 3,391,881 | 7/1968 | Malty | 244/1 |
| 3,443,773 | 5/1969 | Blumrich et al. | 244/1 |
| 3,459,442 | 8/1969 | Deyarmett et al. | 166/343 |
| 3,513,909 | 5/1970 | Peterman et al. | 166/340 |
| 3,517,737 | 6/1970 | Peterson | 166/34 |
| 3,608,848 | 9/1971 | Cantor et al. | 244/1 |
| 3,737,117 | 6/1973 | Belew | 244/1 SD |
| 3,753,536 | 8/1973 | White | 244/1 SD |
| 4,381,092 | 4/1983 | Barker | 244/161 |
| 4,588,150 | 5/1986 | Bock et al. | 244/161 |

FOREIGN PATENT DOCUMENTS 3215229 10/1983 Fed. Rep. of Germany .

2099788 12/1982 United Kingdom .

Primary Examiner—Galen L. Barefoot
Attorney, Agent, or Firm—Russell E. Schlorff; John R. Manning; Edward K. Fein

[57] ABSTRACT

A system for docking a space vehicle 11 to a space station 12 where a connecting tunnel for in-flight transfer of personnel is required. Cooperable coupling mechanisms 51, 52 include docking rings 56, 61 on the space vehicle 11 and space station 12, respectively. The space station is provided with a tunnel structure 15, a retraction mechanism 30, and a docking ring 56 attached thereto. The vehicle coupling mechanism 52 is designed to capture the station coupling mechanism 51, arrest relative spacecraft motions while limiting loads to acceptable levels, and then realign the spacecraft for final docking and tunnel interconnection. The docking ring 61 of the space vehicle coupling mechanism is supported by linear attenuator actuator devices 63 each of which is controlled by a control system (FIG. 10) which receives loading information signals and attenuator stroke information signals from each device 63 and supplies output signals for controlling its linear actuation to attenuate impact loading or to realign the spacecraft for final docking and tunnel interconnection. Retraction mechanism 30 is used to draw the spacecraft together after initial contact and coupling. Tunnel trunnions 21, 22, 23, 25 cooperative with latches 67 on the space vehicle 11 constitute the primary structural tie between the spacecraft in final docked configuration.

9 Claims, 6 Drawing Sheets

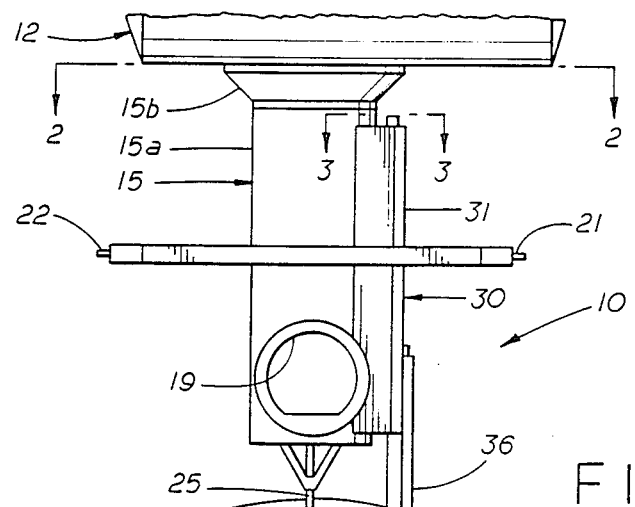
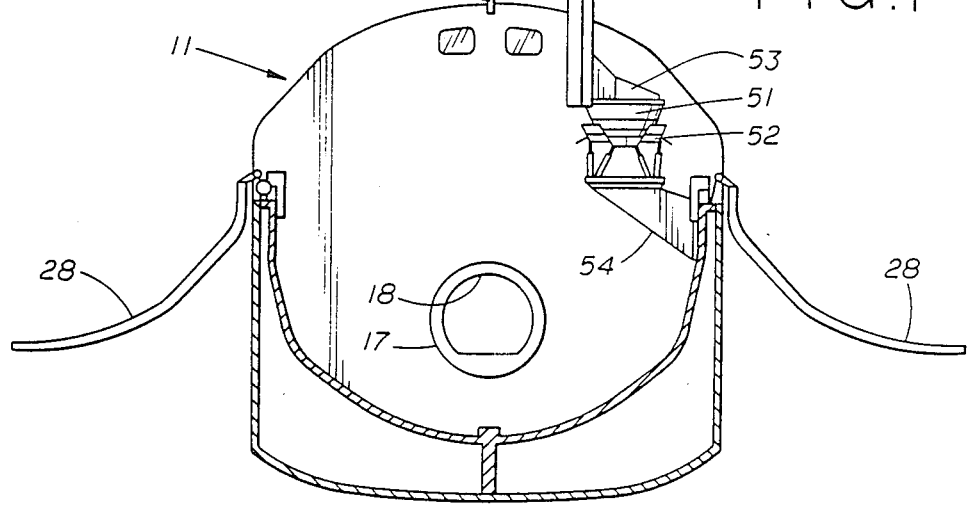
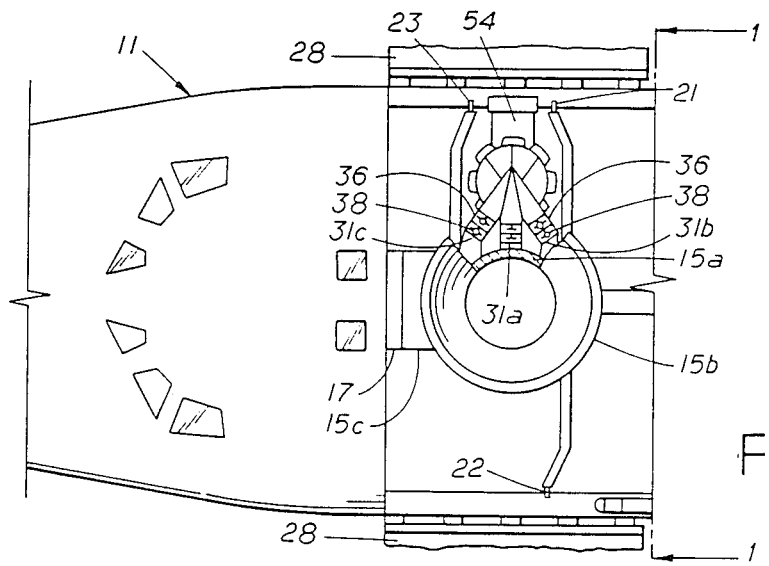
FIG.1
FIG.2

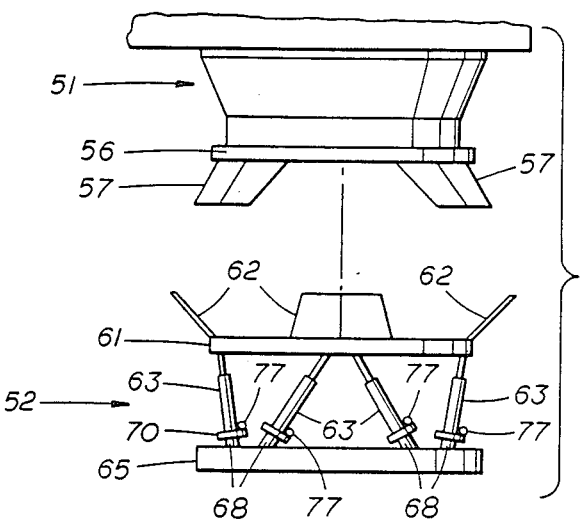
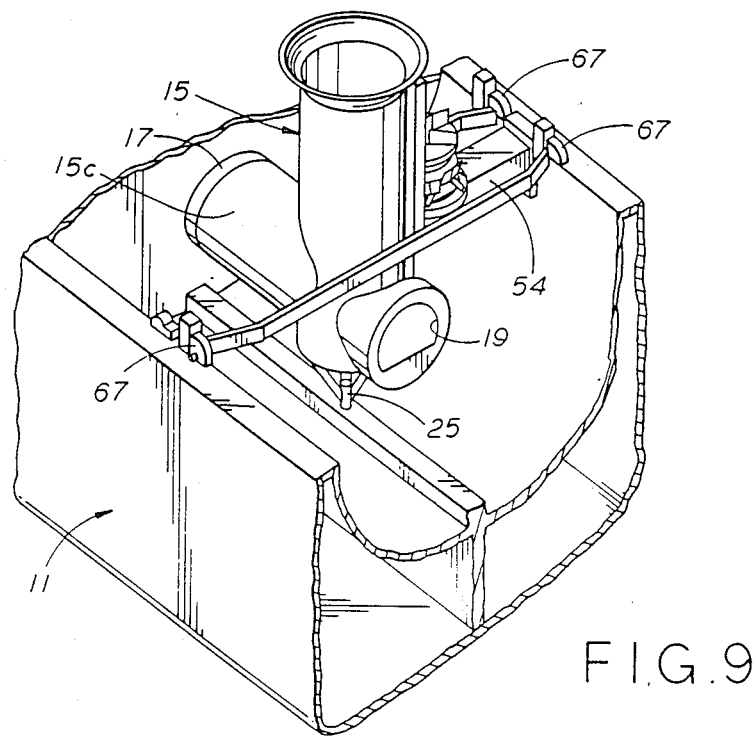

DOCKING MECHANISM FOR SPACECRAFT

ORIGIN OF THE INVENTION

The invention described herein was made by employees of the United States Government and may be manufactured and used by or for the Government of the United States of America for governmental purposes without the payment of any royalties thereon or therefor.

RELATED APPLICATIONS

U.S. patent application, Ser. No. 292,131, filed Dec. 30, 1988 for "Smart Tunnel - Docking Mechanism" (MSC-21360-1) and United States Patent Application, Ser. No. 292,121, filed Dec. 30, 1988 for "Docking System for Spacecraft" (MSC 21327-1) are related applications.

FIELD OF THE INVENTION

This invention relates to docking mechanisms for space vehicles and space structures, and more particularly to a mechanism for the docking and coupling of a space vehicle to a space station.

BACKGROUND ART

The docking of space vehicles, such as the space shuttle orbiter, with space stations or with other space vehicles usually imposes the requirement for in-flight transfer of personnel and cargo. Docking structure designs, which have heretofore been used or proposed to meet this requirement, provide for a combined transfer tunnel and docking mechanism which is mounted in the payload bay of the space shuttle orbiter in coaxial relation with the longitudinal axis of the vehicle. Since the mechanism must be sized to allow through passage of personnel and cargo, the associated large diameter and centerline mounting requires considerable support structure and a heavier structure than would normally be desired from a loads and dynamics standpoint. Further, since the combination structure is fixed in the payload bay during the shuttle's space mission, the net usable payload mass and volume capacity of the orbiter is severely restricted.

In the docking of space vehicles, or a space shuttle orbiter with a space station, the two are brought together usually by means of small maneuvering rockets on the space shuttle orbiter in a maneuver which must provide for correct alignment and positioning of the docking vehicle with respect to docking facilities on the space station. For attenuating potentially substantial impact forces, prior docking mechanisms conventionally employ a plurality of shock absorbers arranged at various angles for accommodating misalignment in the vehicle approach. While such arrangements are appropriate for the docking of small space vehicles, since no great weight penalty is involved in providing for structural rigidity and alignment capability, their use in mechanisms for the docking of large vehicles and space structures may be prohibitively heavy.

A space vehicle coupling mechanism disclosed in U.S. Pat. No. 3,753,536 and representative of the prior art, provides for coupling means on each vehicle with a set of three shocking absorbers incorporated in each of the coupling means for reducing the shock of docking. Other docking mechanisms, of the type utilizing male conical probes and female "drogues", and employing shock absorber arrangements for attenuating the shock of docking impact are disclosed in U.S. Pat. Nos. 3,443,773; 3,608,848 and 3,737,117. U.S. Pat. No. 3,391,881 discloses a docking mechanism including shock absorbing devices for connecting and separating vehicles in space and also provides a sealed tunnel between the vehicles through which personnel can travel from one to the other. All of these prior art mechanisms are characterized by axial coupling of the vehicles and typically require relatively heavy docking structures and impact attenuation devices.

SUMMARY OF THE INVENTION

The invention is a docking system for the docking of a space shuttle orbiter to a space station, particularly where a tunnel connection suitable for in-flight transfer of personnel is required. The system comprises cooperable mechanisms mounted on the space shuttle orbiter and the space station. The system components mounted on the orbiter may be characterized as a variable load attenuation rate, real-time feedback controlled mechanism which is designed to capture the cooperable space station coupling mechanism, arrest the relative spacecraft motions while limiting the resulting loads to acceptable levels, and then realign the spacecraft for final docking and tunnel interconnection. The space vehicle coupling mechanism is mounted inside the payload bay and to one side of the longitudinal centerline of the space shuttle. The space station is provided with a pressurizable transfer tunnel attached about a hatch of the space station, an elongate retraction mechanism which is attached to the tunnel structure, and a docking ring which is cooperable with a docking ring on the space shuttle. The docking ring of the space shuttle coupling mechanism is supported by a plurality of linear attenuator actuator devices each of which is controlled in linear positioning by a control system which receives loading information signals and attenuator stroke and stroke-rate information signals from each device and supplies output signals for controlling its linear actuation to attenuate and limit impact loading to an acceptable level or to realign the spacecraft for final docking and tunnel interconnection. The space station coupling mechanism is mounted on the end of the retraction mechanism, which is used to draw the orbiter and space station together into final docked orientation after initial contact and operation of the respective coupling mechanisms. A trunnion structure, also mounted on the transfer tunnel, and comprising a plurality of trunnions disposed for latching engagement with latches on the space vehicle, constitutes the primary structural tie between the spacecraft in their final docked configuration. The transfer tunnel is interconnectable with the crew cabin of the space shuttle by means of a hatch adapter which attaches to a cabin hatch of the orbiter.

In operation, before the space shuttle orbiter is due to rendezvous, the retraction mechanism on the space station is fully extended to place the space station coupling mechanism in position for a docking contact. The orbiter then approaches the space station in a manner that brings the two coupling mechanisms into contact whereupon the space shuttle coupling mechanism latches to the space station coupling mechanism, thus effecting a capture and linking of the orbiter and space station. After capture, the vehicle coupling mechanism arrests the relative motion of the two docked spacecraft in a manner that limits the resulting loads as needed and moves the two spacecraft into proper alignment for final docking. The retraction mechanism is then operated to pull the two spacecraft together and accomplish insertion of the transfer tunnel and attached trunnion structure into the payload bay of the space shuttle orbiter. At the end of the retraction stroke, the trunnions are locked down in conventional longeron and keel retention latches to complete the structural tie between the spacecraft. Upon latching and sealing of the transfer tunnel to the hatch adapter, the two spacecraft are in a fully docked configuration which permits crew transfer and payload handling operations to proceed.

BRIEF DESCRIPTION OF THE DRAWINGS

FIG. 1 is a sectional view through the payload bay of a space shuttle orbiter as taken along the section line 1—1 in FIG. 2 and showing the docking system of the invention and its orientation with respect to the space shuttle orbiter at the time of initial contact of the orbiter and space station coupling mechanisms;

FIG. 2 is an end view of the docking system of the invention at the time of contact of the orbiter and space station coupling mechanism as taken along the line 2—2 of FIG. 1;

FIG. 3A is a sectional view of the retraction mechanism as taken along the section line 3A—3A in FIG. 3;

FIG. 8 is a side view of the space shuttle orbiter coupling mechanism and the space station coupling mechanism in spaced proximity thereto;

FIG. 9 is a perspective view showing the space shuttle orbiter and space station fully docked, with the transfer tunnel and trunnion structure carried by the space station fully inserted and latched into the space shuttle orbiter;

DETAILED DESCRIPTION OF THE INVENTION

Figure 3:
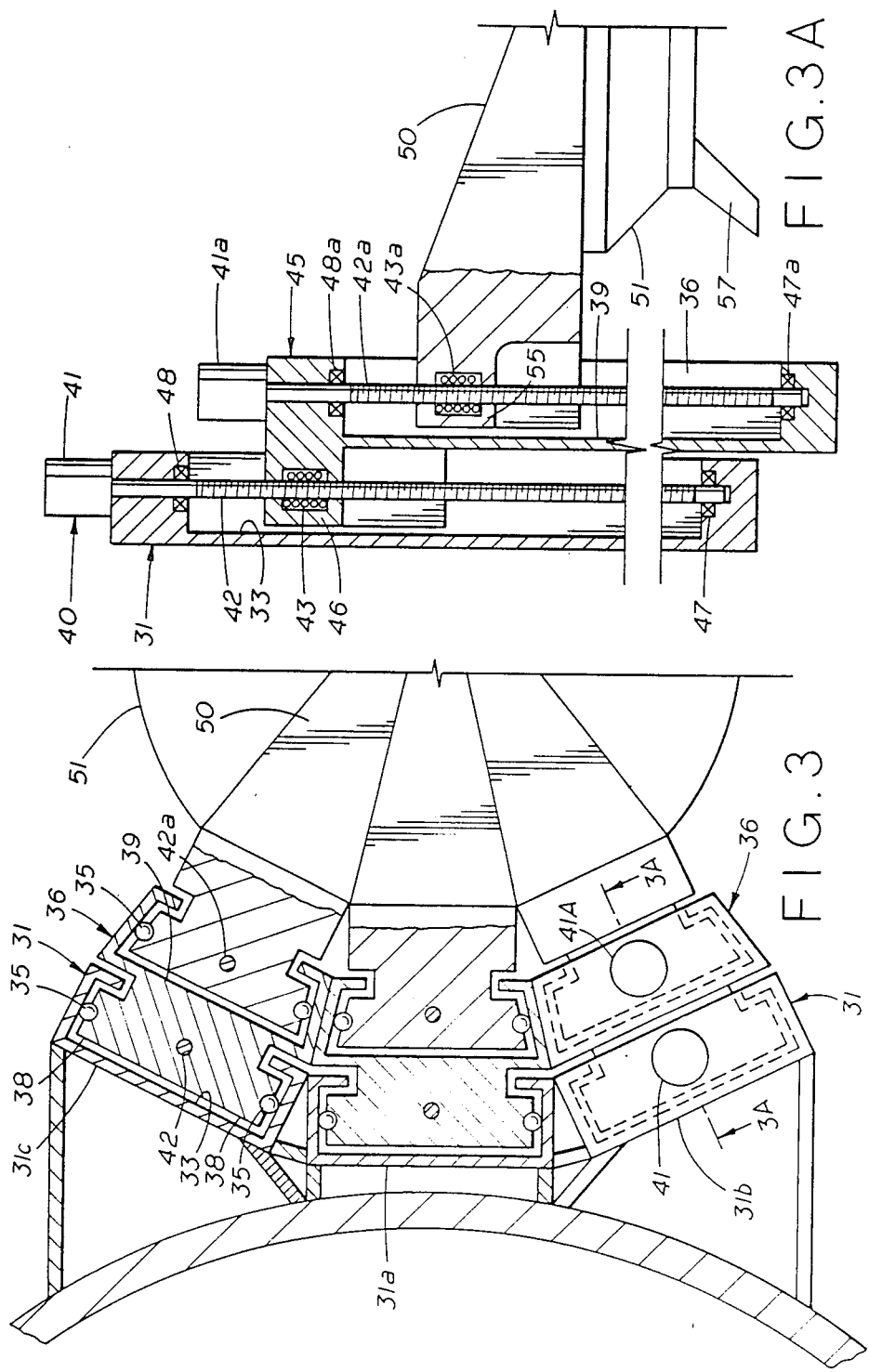
FIG. 3 is an end view of the retraction mechanism of the docking system which is used for drawing the space shuttle orbiter and space station into fully docked orientation.

Referring more particularly to the drawings, there is shown in FIG. 1, a docking system 10 for the docking of a space shuttle orbiter 11 to a space station 12. The docking system 10, which represents a preferred embodiment of the invention, includes a separate coupling mechanism on each of the space shuttle and the space station. In FIG. 1, the system is shown in its configuration at the time of initial contact of the space shuttle orbiter coupling mechanism with the space station coupling mechanism.

The portion of the docking system which is mounted on the space station includes a pressurizable tunnel structure 15, the principal portion 15a of which is of hollow cylindrical form, of a diameter sufficient to accommodate the passage of personnel. The cylindrical section 15a is provided with a flared adapter section 15b at the end thereof which connects with the space station. The adapter section 15b is shown as a frusto-conical member, the contact end of which is arcuately configured to conform with the curved space station hatch about which it sealingly engages with the space station. The adapter section 15b could, of course, be modified as necessary to accommodate connection of the tunnel structure with hatches of different configuration.

At its other end, the tunnel structure 15 is provided with a right angle extension 15c, which in the final docking configuration of the system is connectable to a hatch adapter 17 fitted to a hatch 18 which opens to the crew cabin of the space shuttle orbiter. Directly opposite the tunnel extension 15C, the tunnel structure is provided with a hatch 19, which when the orbiter is fully docked to the space station, permits egress of space station or orbiter personnel into the payload bay of the orbiter.

A trunnion structure consisting of three longeron trunnions 21, 22, 23 and one keel trunnion 25 with appropriate support structure for each, is mounted on the tunnel structure 15 and in the final docked configuration of the system to be hereinafter described will constitute the primary structural tie between the orbiter 11 and space station 12.

Figures 6, 7:
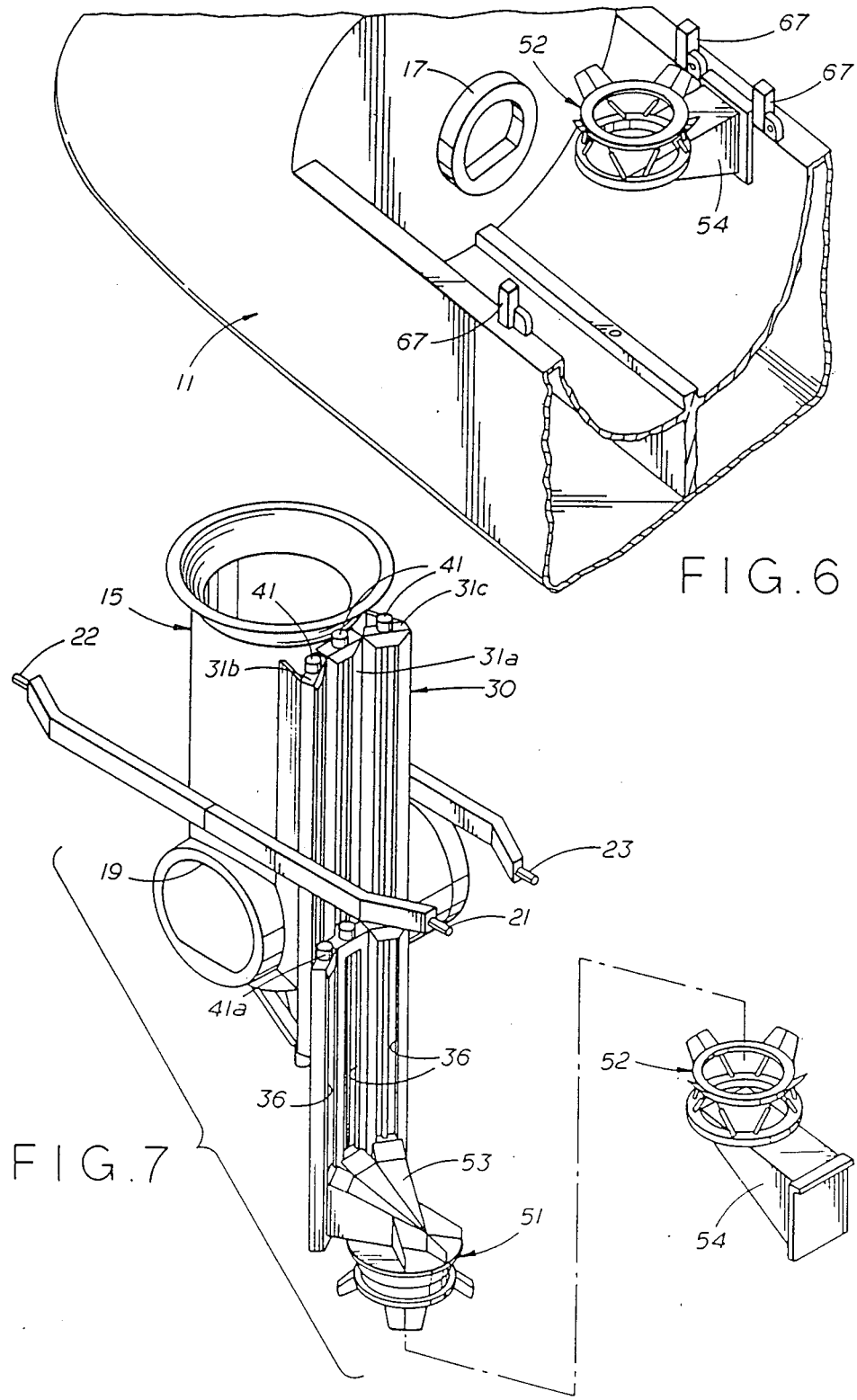
FIG. 6 is a perspective view of the coupling mechanism which is the space shuttle component of the invention.
FIG. 7 is a perspective of the portion of the docking system component which is affixed to the space station.

Also affixed to the side of the cylindrical tunnel section 15a is a primary slide track member 31 of a retraction mechanism 30. The primary slide track member 31 extends parallel to the longitudinal axis of the tunnel section 15a and, as shown in FIGS. 3 and 7, comprises a central web section 31a and side sections 31b, 31c formed at an angle thereto. The central section and side sections are each provided with dovetail slide grooves 33, housing precision linear bearings 35, as shown in FIG. 3, which extend the length of the primary slide track 31 in parallel relation to one another.

The retraction mechanism 30 further includes a secondary slide track member 36, provided with three longitudinally extending tongue members, each including a pair of longitudinally extending flanges 38 with the three pairs of flanges 38 being slidably received in the three pairs of dovetail grooves 33 of the primary slide track member 31. Directly opposite to each flanged tongue, the secondary slide 36 is provided with a set of three longitudinally extending dovetail grooves 39 housing precision linear bearings 35. These grooves and bearings slidably receive the carriage member 50 of the retraction mechanism.

Figure 5:
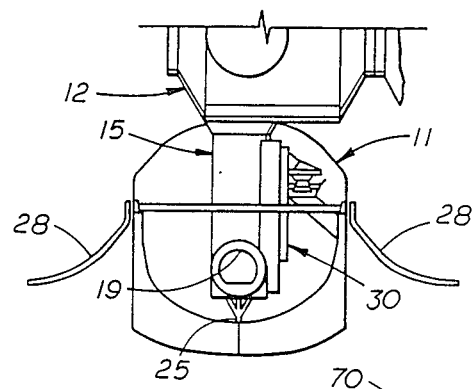
FIG. 5 is a view taken along the same section line as FIG. 1, which also shows the docking system as it appears when the space shuttle orbiter and space station are fully docked.
Figure 11:
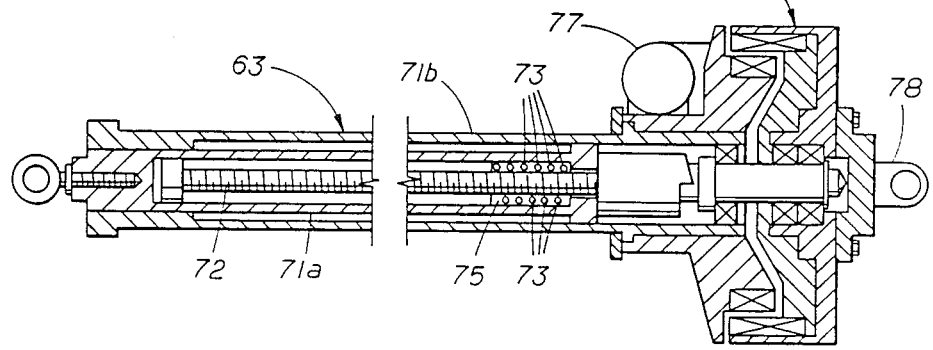
FIG. 11 is a sectional view of one of the plurality of attenuator devices in the space shuttle coupling mechanism which is responsive to the control system of FIG. 10 for providing a variable load attenuation rate, real-time feed-control for the docking system of the invention.

The retraction mechanism 30 is operable by any appropriate means but in the preferred embodiment illustrated herein, its actuation is by two pairs of ball screw mechanisms, one pair 40 of which is provided for actuation of the secondary slide track member 36 within the primary track 31, and the second pair 45 which is provided for actuation of the carriage member 50 within the secondary track. One pair of ball screw mechanisms 40 drive the carriage member 50 to the bottom of the secondary slide track 36 which is simultaneously drive, by the second pair of ball screw mechanisms 45, to an extended position relative to the primary slide track member 31 as shown in FIGS. 1 and 7 or a retracted position wherein the secondary track member 36 is disposed alongside the primary track member 31 throughout its length and the carriage member 50 is positioned at the top of the secondary slide track 36 as shown in FIG. 5.

Each ball screw actuator as shown in FIG. 3a typically comprises a reversible electric drive motor 41, a motor shaft in the form of a ball screw 42, and a relatively traveling ball nut 43 sleeved about the screw 42 in driving engagement therewith. Each side section of the secondary slide track member 36 and the side sections of the carriage member are provided with a longitudinally extending bore for receiving the ball screws 42, respectively. The ball nut 43 of each actuator is seated and fixed within the opening of a yoke member 46 which is a lateral extension of the slide track member 36. Accordingly, energization of the motors 41 results in relative movement of the ball nuts 43 and the ball screws 42 and therefore a movement of the secondary slide track member 36 relative to the primary slide track member 31 and the carriage member 52 relative to the secondary slide track 36 respectively. Similarly, each ball screw actuator 45 for driving the carriage 50 is comprised of a drive motor 41a, ball screw 42a supported in bearings 47a at respective ends of the secondary slide track member 36. A relatively travelling ball nut 43a is sleeved about the screw 42a and is retained in a yoke 55 provided as an extension of the carriage 50. Accordingly, energization of the drive motors 41a results in movement of the ball nuts 43a relative to the slide member 36 and therefore a movement of the carriage 50 in a direction towards or away from the motors 41, depending on the direction of rotation of the ball screws as determined by the selected mode of operation of the motors 41. The purpose of providing a pair of ball screw actuators for driving the secondary slide track member 36 and the carriage member 50 is to preclude possible binding of the slide track members 31, 36 and binding of the carriage member 50 and to also provide redundancy.

The rendezvous and docking of a space vehicle with a space station is a complex maneuver which relies on the successful operation of many spacecraft systems. As the space vehicle is brought into close proximity to the space station, it must be properly aligned with the docking facilities provided on the space station. Such alignment will require an axial alignment with respect to the vehicle roll axis and correct roll positioning if umbilical connections are to be made between the vehicle and the space station. A docking mechanism which is suitable for the docking system of the present invention, is that which was used in the Apollo-Soyuz Test Program, a joint endeavor of the United States of America and the Union of Soviet Socialist Republics. As shown in FIG. 8, the mechanism comprises a pair of cooperable coupling mechanisms 51, 52, the coupling mechanism 51 being attached by a brace 53 to the carriage member in the secondary slide member 36 of the retraction mechanism 30 and the coupling mechanism 52 being attached by a brace 54 to the side wall of the payload bay of the space vehicle. In preparation for docking, the doors 28 of the payload bay of the shuttle orbiter are opened.

The coupling mechanism 51 comprises a docking ring 56 with four alignment fingers 57 spaced equiangularly about the ring 56 and extending radially and outwardly therefrom at an angle to the plane defined by the ring 56. The coupling mechanism 52, illustrated in U.S. Pat. No. 4,682,745, comprises a berthing or docking ring 61 of either circular or octagonal configuration, which is provided with four alignment fingers 62 attached at equiangularly spaced locations on the ring 61. Each of the alignment fingers 57, 62 is broader at its end which connects with its associated docking ring than at its free end. Accordingly, as one or more of the fingers 57 of the space shuttle orbiter coupling mechanism engage with the fingers 62 of the space station coupling mechanism and are interleaved therewith, the fingers 57 are cammed to effect relative rotation of the coupling mechanisms 51, 52, as the orbiter more closely approaches the space station. A continued movement of the space shuttle towards the space station will bring the rings 56 and 61 into flush engagement with one another whereupon cooperative latching members on the docking rings 56, 61 on the alignment fingers 57, 62 are activated to link the mechanisms 51, 52 together.

Since the space station and space shuttle orbiter represent relatively large masses, the rocket maneuvering of one with respect to the other may generate substantial forces on impact which must be attenuated. For this purpose a shock attenuation system is provided in the form of a plurality of attenuator actuator devices 63, preferably eight in number each of which is attached at one end by a pivot or swivel connection to the berthing ring 61 and at its other end by a pivot or swivel connection to a rigid support ring 65. Each of the attenuator devices 63 is attached at an angle with respect to the planes of the berthing ring 61 and support ring 65.

The actuator attenuator devices 63 are preferably linear actuators, such as shown in FIG. 6. Each of the devices 63 is comprised of telescoping members 71a, 71b and preferably is of a conventional ball screw type which includes a reversible drive motor 70 adapted to respond to electrical command signals for turning a screw 72 to effect a telescopic movement of the members 71a, 71b in a linear expansion or contraction. The screw 72 extends in coaxial relation to the telescopic member 71b and although adapted for axial rotation is otherwise fixed in position relative to the member 71b. The ball drive mechanism typically includes a plurality of bearing balls 73 which are located in concave helical grooves in the screw 72 and a cylindrical ball nut 75 which is anchored to the inner wall of the telescopic member 71a. Turning of the screw 72 effects a travel of the nut 75 relative to the screw 72 and therefore a linear telescopic movement of the member 71a relative to the member 71b in a direction dependent on the direction of axial rotation of the screw 72.

Figure 10:
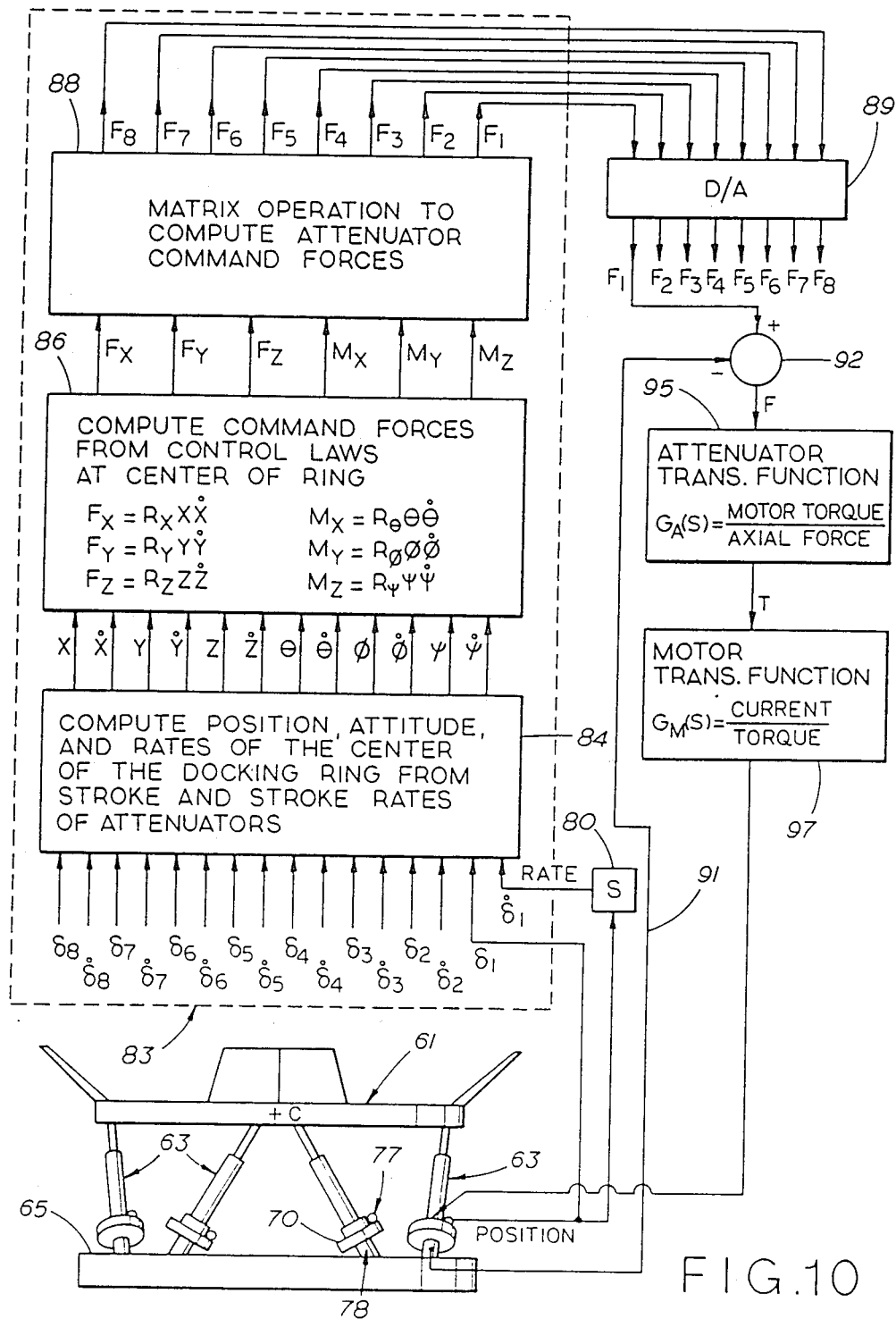
FIG. 10 is a schematic diagram of the control system which arrests relative motion of the space shuttle and space station following capture of the space station coupling mechanism by the space shuttle coupling mechanism and limits the resulting loads.

Also mounted on each attenuator actuator 63 is an optical encoder 77 which senses the relative position of the telescopic members 71a, 71b and hence the actuator stroke and provides an electrical signal representative thereof to a control system shown schematically in block diagram form in FIG. 10. Each attenuator actuator 63 is also provided with a load sensor 78 which is mounted thereon for sensing axial loadings imposed on the attenuator actuator 63. An electrical signal representative of the axial loading is also transmitted to the control system of FIG. 10 by an appropriate conductor (not shown).

As previously stated, the space shuttle orbiter coupling mechanism 52, in addition to its function of capturing the corresponding cooperable space station coupling mechanism 51, is designed to arrest the relative spacecraft motions while limiting the resulting loads to acceptable levels, and then realign the two spacecraft for tunnel insertion and interconnection. These functions are accomplished by control of the eight attenuator actuator devices 63, using a control system such as is illustrated schematically in the block diagram of FIG. 10.

As illustrated in FIG. 10, each of the attenuator actuators 63 supplies stroke information, $\delta$, by means of an electro-optical encoder device, which transmits the relative position of the telescopic members in the form of electrical signals to a differentiator 80 which differentiates the inputs and generates an output signal, $\dot{\delta}$, representing stroke velocity of the telescoping attenuator/actuator. Accordingly, two such output signals are generated for each attenuator actuator 63 and the sixteen signals are delivered to a microprocessor 83 which includes a first logic circuitry 84 for computing therefrom position, attitude and velocity rates for the geometric center point C of the docking ring 61. The logic circuitry 84 generates output signals, as shown, which are representative of such position, attitude, and velocity rates and delivers them to logic circuitry 86. The logic circuitry 86 computes six command forces from control laws which are functions of the position, attitude and velocity rates in free space of the center C of the docking ring 61. There is one control law equation for each of the six degrees of freedom of motion for the ring 61 and six command signals representing the forces Fx, Fy, Fz and moments Mx, My and Mz in the three dimensions are generated as outputs. A matrix operation is then performed by microprocessor circuitry 88 to resolve these six command forces into eight equivalent attenuator axial forces, $F_1$-$F_8$. The microprocessor 83 then outputs these eight signals to a digital-to-analog converter 89 which generates analog versions of the signals $F_1$-$F_8$ that are proportional to the eight attenuator forces needed to be sustained by the eight attenuator actuators 63.

In addition, the control system includes a force feedback loop 91 from each load cell 78 at the base of each attenuator actuator 63. The feedback signal is summed in an adder 92 with a command force signal from the microprocessor converter 89 to provide a resulting output signal F which is fed through a transfer function circuit 95 to provide an output signal T which is proportional to the torque required to produce the attenuator axial force. The signal T is then fed through a transfer function circuit 97 for the DC drive motor 70 to provide an output signal of current for driving the motor 70. It is to be noted that eight feedback signals are delivered to eight adders 92 and eight output current signals from transfer function circuits 97 are generated for controlling each of the attenuator actuators 63.

Figure 4:
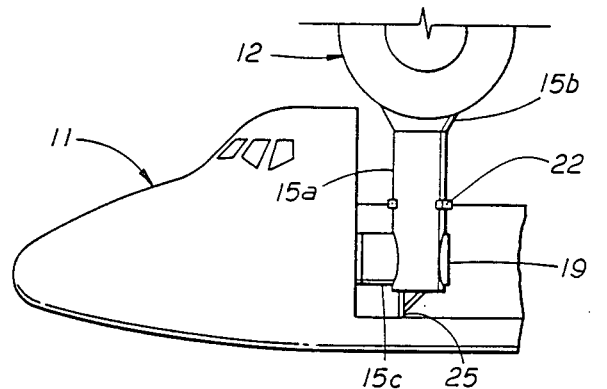
FIG. 4 is a side view of the space shuttle and docking system of FIG. 1 with a portion of the vehicle removed to show the docking system in final docked configuration of the spacecraft.

A docking procedure and description of the docking system of the invention is as follows. Once the space vehicle 11 has achieved an orbit and its crew intends to dock with a space station, the payload bay doors 28 of the space shuttle orbiter are opened to expose the space vehicle coupling mechanism 52. On the space station 12, before the space vehicle is due to rendezvous, the retraction mechanism 30 is fully extended so as to place the space station coupling mechanism 51 in a docking contact position. The orbiter then approaches the space station in a manner that brings the two coupling mechanisms into contact as shown in FIG. 1. Once contact is made, the space shuttle orbiter coupling mechanism 52 aligns with and latches to the space station coupling mechanism 51, thus capturing it and linking the spacecraft. After capture, the space shuttle orbiter coupling mechanism 52 arrests the relative motion of the two spacecraft in a manner so as to limit the resulting loads. The load attenuation requirements are dependent on the mass properties of the particular spacecraft involved. After stopping relative spacecraft motion, the space shuttle orbiter coupling mechanism 52 also operates to properly align the two spacecraft preparatory to transfer tunnel insertion into the payload bay. This may be automatically accomplished by commanding the attenuator/actuators to move to the proper position, or by suitable alignment mechanisms (not shown) which are well known in the art. The retraction mechanism 30 is then operated in the retraction mode to pull the two spacecraft together as shown in FIGS. 4 and 5, where the trunnions of the trunnion structure, at the end of the retraction stroke, are engaged and latched by conventional latching mechanisms 67 affixed to the keel and longerons on the sides of the space shuttle orbiter, thus completing the structural tie between the space shuttle orbiter and the space station. The transfer tunnel 15 can then be latched and sealed to the hatch adapter 17 leading to the crew cabin of the space shuttle orbiter either manually by mechanical latching dogs operated from within the space shuttle orbiter or an automatic latching and sealing means (not shown) as may be appropriate. The space shuttle orbiter 11 and space station 12 are then in their final docked configuration as shown in FIGS. 4 and 5 and crew transfer and cargo handling operations can then be commenced.

To undock, the connection between the tunnel structure 15 and the hatch adapter 17 to the crew cabin must be released, the trunnion latches 67 released, the retraction mechanism 30 operated to its fully extended position, and the orbiter and space station coupling mechanisms 51, 52 unlatched. It is to be understood that the various latching mechanisms, all of which are conventional, can be unlatched by manual or automatic means as may be desired.

It will thus be seen that a significant advantage of the docking system of the present invention over previous spacecraft docking concepts is a reduction in weight and volume of vehicle mounted hardware which is needed to effect docking. This results in an increase in the net payload capacity of the space shuttle orbiter and an associated reduction in operations costs. These advantages are achieved by several features including the concept of permanently locating the transfer tunnel structure on the space station where it is separated from the space shuttle orbiter until final docking. This allows for designing the coupling mechanisms of the two spacecraft to be designed solely on a loads and dynamics basis, permitting them to be made smaller and lighter than previous designs. Secondly, the space shuttle orbiter coupling mechanism is located in position inside the payload bay which is offset from the space shuttle orbiter's longitudinal centerline and cantilevered from one side of the payload bay. This location feature, reduces the support structure required with previous concepts and takes up less space in the payload bay. Thirdly, the use of a variable load attenuation rate, real-time feedback-controlled docking mechanism allows the peak loads and moments during docking to be limited such that the coupling mechanism and support structures can be reduced still further.

While the foregoing description of a preferred embodiment of the invention has been presented for purposes of illustration and explanation, it is to be understood that it is not intended to limit the invention to the precise form disclosed. For example conical probe and drogue type coupling mechanisms could be used in lieu of docking rings 56 and 61, or the number of attenuator actuators 63 could be other than eight in number. It is to be appreciated therefore, that various structural changes may be made by those skilled in the art without departing from the spirit of the invention.

We claim:

1. A docking mechanism for the docking of a space vehicle having a payload bay with a space station having an egress hatch, said docking mechanism comprising:
    a space station docking structure mounted on said space station, said docking structure comprising an elongated tunnel structure attached at one of its ends in sealing relation with the space station about the egress hatch thereof;
    a first docking ring;
    means for mounting said first docking ring to the tunnel structure whereby said first docking ring is selectively movable between a retracted position closely adjacent the tunnel structure and a deployed position wherein said first docking ring is extended from the tunnel structure to a position appropriate for coupling engagement with a space vehicle;
    a space vehicle docking structure mounted on said space vehicle, said space vehicle docking structure comprising a second docking ring;
    a rigid support ring mounted on a wall of the payload bay in a location which is offset from the centerline of the space vehicle;
    a plurality of linearly expansible attenuator actuator devices interconnecting said second docking ring and rigid support ring and movably supporting said second docking ring on the rigid support ring in an exposed position when the payload bay is in opened condition;
    coupling means responsive to substantially coaxial engagement of said first and second docking rings by an aligned approach of the space vehicle to the space station for coupling said first and second docking rings;
    impact attenuation means comprising said plurality of linearly expansible attenuator actuator devices for attenuating and absorbing the docking impact of the space vehicle and space station; and
    means responsive to retraction of the active docking ring after coupling engagement of said docking rings for establishing a structural tie between said space vehicle and space station and sealing connection of said tunnel structure with said space vehicle for establishing a passageway for the passage of personnel and equipment between the space vehicle and space station.

2. A docking mechanism as set forth in claim 1 further including means for sensing and signaling the impact loadings on each of said linear actuator devices upon a docking impact of the space vehicle with the space station, and wherein said attenuator actuator devices are responsive to signals from said sensor means for attenuating said docking impact by linear contraction of said plurality of attenuation actuator devices.

3. A docking mechanism as set forth in claim 1 wherein said means responsive to retraction of the first docking ring for establishing a structural tie between the space vehicle and space station comprises a plurality of trunnions affixed to said tunnel structure by trunnion supporting structure and a plurality of trunnion latching mechanisms mounted on said space vehicle which are responsive to engagement by said trunnions in the fully retracted position of said first docking ring for securing the trunnions and establishing a structural tie between the space vehicle and space station.

4. A docking mechanism as set forth in claim 1 wherein each of said attenuator actuator devices is comprised of a pair of linearly adjustable telescopic members with a ball-screw drive mechanism responsive to electrical signals for controlling the linear adjustment of the telescopic members and the pivotal movement of the actuator device with respect to said second docking ring and said rigid support ring.

5. A docking mechanism as set forth in claim 1 wherein each of said attenuator actuator devices is comprised of a pair of linearly adjustable telescopic members with reversible drive means responsive to electrical control signals for controlling the linear adjustment of the telescopic members, and said docking mechanism further includes means for sensing and signaling the impact loadings on each of said attenuator actuator devices;
    means for sensing and signaling the relative position of said telescopic members of each attenuator actuator device; and
    a control system responsive to said sensing signals for generating electrical control signals for controlling the linear actuation of each of said attenuator actuator devices whereby impact loads resulting from docking impact of the space station and space vehicle may be attenuated to acceptable levels, relative motion between space vehicle and space station may be arrested, and the spacecraft aligned for insertion and connection of the tunnel structure in the payload bay of the space vehicle.

6. A docking mechanism as set forth in claim 1 wherein said means for mounting said first docking ring to the tunnel structure comprises a pair of elongate slide members and a carriage member, a first of said slide members being rigidly attached on the exterior of said tunnel structure and the second of said slide members being slidably mounted on said first slide member, and the carriage member being slidably mounted on said second slide member, said first docking ring being attached to said carriage member, and reversible drive means for selectively controlling the relative sliding movement of said second slide member to said first slide member and said carriage slide member to said second slide member and selectively positioning said first docking ring in a range of movement between and including said retracted and deployed positions.

7. A docking mechanism as set forth in claim 1 wherein said tunnel structure and space vehicle are provided with cooperable hatch means for establishing communication therebetween when said tunnel structure is inserted in the payload bay of the space vehicle and sealingly connected therewith.

8. A docking mechanism as set forth in claim 7 wherein said control systems includes a microprocessor which receives input signals from said electro-optical encoder device which represent the relative position and axial velocity of the telescopic members of each of said attenuator actuator devices and generates output signals which are combined with feedback signals of attenuator actuator axial force from said load sensing means to provide output drive signals for driving each of said attenuator actuator devices.

9. A docking mechanism as set forth in claim 8 wherein said plurality of attenuator attenuator devices are at least six in number.

* * * * *